(12) United States Patent
Moore et al.

(10) Patent No.: US 8,897,766 B2
(45) Date of Patent: Nov. 25, 2014

(54) SYSTEM OF EDGE BYTE CACHING FOR CELLULAR NETWORKS

(71) Applicant: International Business Machines Corporation, Armonk, NY (US)

(72) Inventors: Victor S. Moore, Lake City, FL (US); Duke Chang, Hillsborough, NC (US); Joseph Dinakaran, Apex, NC (US); Robert Thomas Madey, Spicewood, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/769,972

(22) Filed: Feb. 19, 2013

(65) Prior Publication Data
US 2014/0235231 A1 Aug. 21, 2014

(51) Int. Cl.
*H04W 4/00* (2009.01)
*H04W 28/02* (2009.01)
*H04W 28/08* (2009.01)

(52) U.S. Cl.
CPC .............. *H04W 28/02* (2013.01); *H04W 28/08* (2013.01)
USPC .......................... 455/422.1; 455/436; 455/453

(58) Field of Classification Search
None
See application file for complete search history.

(56) References Cited

U.S. PATENT DOCUMENTS

| 7,424,577 | B2 | 9/2008 | Bali et al. | |
| 7,986,713 | B2 | 7/2011 | Sandstrom | |
| 2001/0051525 | A1* | 12/2001 | Rayne | 455/453 |
| 2010/0070570 | A1 | 3/2010 | Lepeska | |
| 2012/0064908 | A1* | 3/2012 | Fox et al. | 455/452.2 |
| 2012/0309355 | A1* | 12/2012 | Pudney et al. | 455/411 |

FOREIGN PATENT DOCUMENTS

WO WO2008149348 12/2008

* cited by examiner

*Primary Examiner* — Suhail Khan
(74) *Attorney, Agent, or Firm* — David A. Mims, Jr.; Darcell Walker (57) ABSTRACT

The present invention is a method and system that reduces the amount of data traffic across communication links in a cellular network. In this system, the cellular device of a user receives and stores state information about a byte of data. During the implementation of the method of this invention, when a user desires to retrieve data from the Network Core, tokens containing a description of the state information for the requested data are sent to the cellular device. The cellular device can then have these tokens resolved by a Node B cell site that has stored the requested data. This approach reduces the need to resend the data from the Network Core over communications links. Further, the cellular devices can freely move from cell site to cell site with little interruption or loss of information.

4 Claims, 7 Drawing Sheets

SYSTEM OF EDGE BYTE CACHING FOR CELLULAR NETWORKS

FIELD OF THE INVENTION

This invention relates to a system that reduces the amount of data being transmitted over cellular networks which will decrease the amount of bandwidth required to perform data transmissions. In particular, this invention relates the system for reducing the amount of data transmitted over microwave links in the cellular networks by using edge byte caching at network core locations and Node B locations in the cellular network.

BACKGROUND OF THE INVENTION

Cellular telephones are an integral part of society today. A substantial number of people throughout the world have and use cellular telephones. For many people, the cellular telephone is their primary means of communicating, and of receiving and sending information. Individuals use cellular telephones for personal business, and also in the work environment to conduct business matters. Cellular telephones have become a convenient means to take pictures, record events and save and retain information. As technological advancements with regards to the cellular telephone occur, more features are available on the cellular telephone. People easily find new uses for the cellular telephone based on the new features. Many consumers pre-order the latest cellular telephone devices and often, there are long lines of consumer waiting to be the first to have the new devices with the latest technology.

Currently, with all of the new technical developments and the expanded uses for small mobile electronic devices, the cellular telephone industry is going through a major transition. Most of the original usage of cellular phones was voice usage. People used cellular phones to conduct verbal communication. A main type of cellular phone was the "feature" phone. These earlier phones did not have big screens and many of the current features and they were used primarily to make telephone calls. Today, there the 'smart' phone. The current cellular phone devices have many more features than original cellular phones. As a result, people are finding more uses for these phones. Further, where the primary use of original cellular phones was voice, today people are using their cellular phone devices to transmit data (i.e. text and images). In fact, usage of cellular phones is becoming more to transmit data than voice. This shift in usage from voice to data is creating a challenging situation for the cellular phone network providers. The original design of cellular networks did not anticipate the increasing transmission of data. The increase in data traffic places a strain on the cellular network operations.

Figure 1:
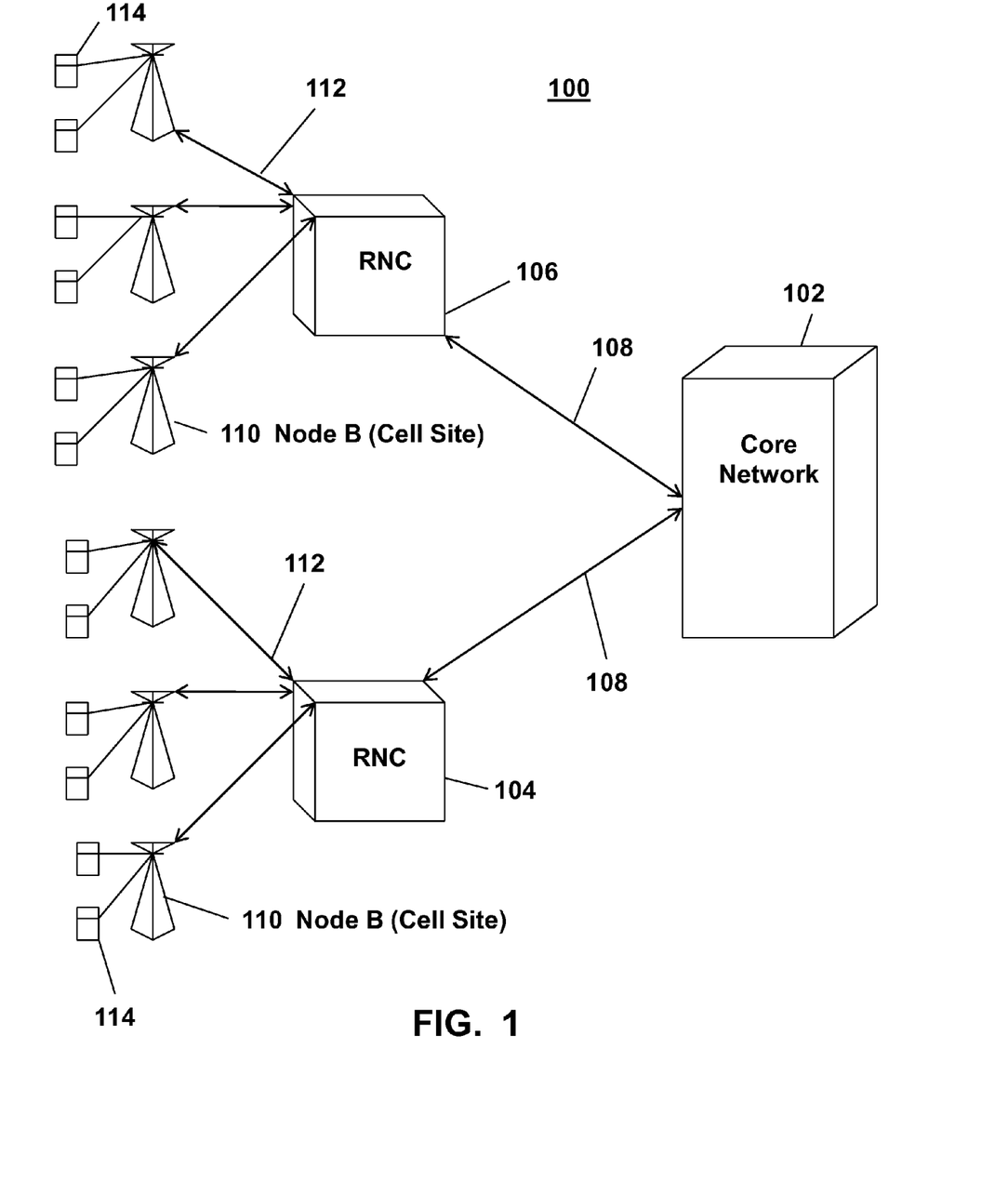
FIG. 1 is an illustration of a cellular network configuration containing a network core, radio node controller (RNC) and multiple Node B cell sites.

A conventional cellular network configuration 100 shown in FIG. 1 has antennas, radios and logic 192 referred to the 'Node B'. The cellular telephone devices 104 communicate with and through the cellular network through the Node B. In the cellular network 100, the Node B communicates with the Radio Node Controller (RNC) 106 and 108. One RNC 106 may have connected to it a hundred Node Bs 102. The connection between the Node B and RNC can be through to microwave link 110. Next the RNC connects to the core network 112. The core network 112 can also have several RNCs connected to it. Because these communication links 110 are microwave links, there is a limited amount of bandwidth available to transmit information across these microwave links. These communication links have plenty of bandwidth to transmit voice communications. However, with the increased use of data-driven application's such as browsing the web, texting and watching videos via their cellular phones, the bandwidth on these microwave links is approaching the capacity of use.

The long-term solution is to upgrade the communication links. One upgrade option is to replace the microwave links with fiber. However, this option is incredibly expensive to implement. A second, but more short-term option is to reduce the amount of traffic transmitted across these microwave links. Therefore, there is currently a financial issue associated with the upgrade of the communication links to accommodate the increasing data traffic.

Specially, to address this bandwidth issue, the preference is to reduce the amount of information flowing between the RNC 198 and the Node B 102. Currently, there are some known techniques that one can implement to reduce this flow of information. One technique is caching. Another technique is data compression. However, there are some limitations with the use of these techniques to address the specific problems related to the transmission of data in cellar telephone networks.

Figure 2:
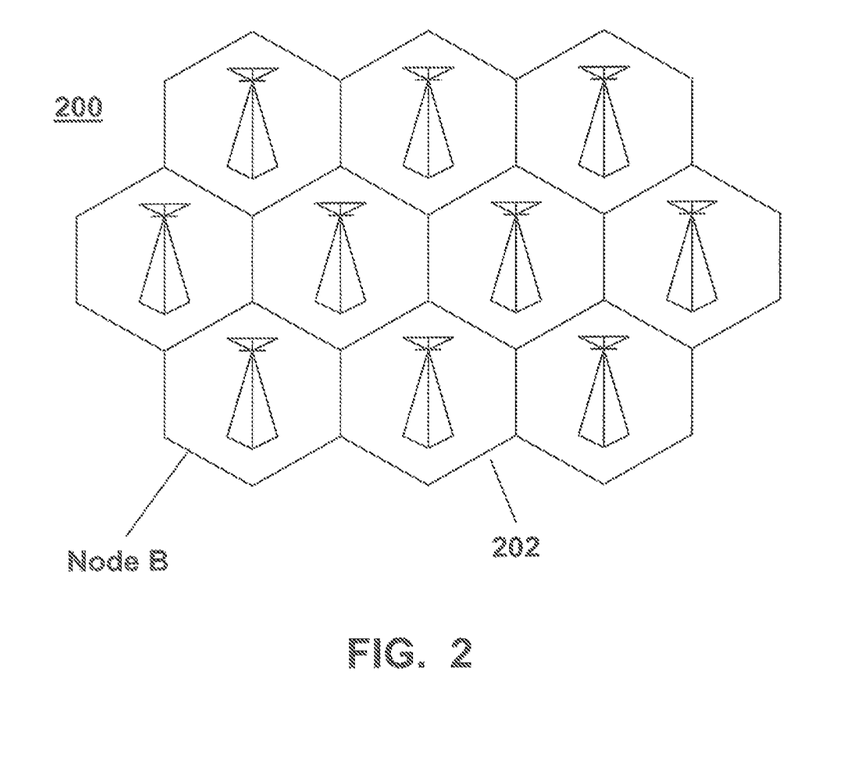
FIG. 2 is a display of several Node B cell sites comprising a network of adjacent cellular sites, each cell site having an antenna, radio and logic.

The cellular telephone design and the cellular telephone protocols are designed to enable a cell phone user to roam through a cellular network. Referring to FIG. 2, a cellular network 200 is comprised of several little cells 202. A user can transparently move from one cell to another cell. The user is not disturbed as they move between cells. In some locations, such as metropolitan areas, a cellular phone user can be in one location and east switch cell sites every few seconds and not notice. The cellular network addresses all of the switching from one cell to another cell for the user.

If there is a decision to use data compression to address the current data transmission concern, there would be real challenges to using that technology with regards to cellular telephones. The decision is to compress the data packet as it is seat from the RNC to the Node B. In practice, as long as the user receiving the packet remains at the same Node B (cell site), they can receive the entire sent packet. However, if the user moves to another cell site location before all of the pickets are received, the current technology does not know how to route packets to the new cell site location of the use such that the user can continue to receive packets. Currently, the RNC has to route all of the packets to the same cell site in order for the compressed information to be decompressed and sent to the user. Document compression is based on everything that is in the document. If the user moves from tower to another during the receipt of a packet, that packet could be lost. The user could receive another packet at the new cell site location as long as the user stays at the cell site location. However, the user may move through several cell site locations while trying to receive information that is transmitted to the user through antennas at the cell site locations. For example, a user requested document may have 10 packets that need to be sent to the user. The user may be at one cell site location and receive the first three packets. While receiving the fourth packet the user may move to another cell site location. The use would lose the fourth packet. However, the user may stay at the second cell site long enough to receive the filth packet. Even though all ten packets of the information were sent to the user, because the user moved from one cell site to another, the user did not receive all ten packets of the information. Therefore, the transmission of the information was useless.

In another example, a user is watching a movie on cell site ten, if the user moves to cell site eleven, there will be an interruption in the movie because the movie was being streamed to cell site ten. With current technology, moving from one cell site to another cell, site while receiving a packet with cause the loss of data.

The limitation of the current technology regarding the transmission of data to a cell site and to the user requesting the information is that cell sites contain state information about the transmitted data. An example of state information is the packer count of information being sent to a user. When a cell site is receiving the packets of information, the cell site is counting and tracking the information packets being received. During a transmission, the initial cell site may have received packets one, two and three. If the user moves to another well site, the new cell site will start counting and tracking packets. However, there count would also be one, two and three even though that cell site is receiving packets four, five and six. Therefore, the packet count will be inaccurate. When moving between cell sites, the state information regarding that transmission will be in two different cell sites. In order to process the information into a usable form for the user, all of the state information regarding that transmission has to be in one cell site location.

A form of data transmission for fixed devices such as laptops and desk top computers is referred to as byte caching. In byte caching, information is stored in a cache (temporary memory) until needed. Node B sites have cache memories. During a transmission to a user, information including state information is received at cell site and stored in the cache. Since the requesting device (desk top computer) is stationary, all of the information remains in the cell site location with interference or disruption. However, with a mobile device, if the device moved to another cell site location, the information (including state information) in the cache of at the first cell site location would be useless to the user because user is not communicating with a different cell site.

The current technology at the Node B (networks edge) of a cellular network provides caching to fixed location devices like laptops and desktop computers which connect to the Internet via the cellular network. Today, the current technology does not provide services of any kind to mobile devices like IPhones, Androids, iPAds or other cell phones. The reason for this restriction is that: 1) the edge cache state information is not preserved when to mobile device moves from one cell to another, 2) the caches in adjacent cells cannot be synchronized for either macro diversity or cell hand offs, and 3) a hard TCP connection break occurs when a mobile device moves from one cell to another, which disrupts the cache and CDN and in general causes considerable network latency. This remains a need for method and system that would enable to user of it mobile device to move between cell sites without disruption of service or loss of transmitted information. There also remains a need for a byte cache that will work properly at the edges of a cellular network even when the client moves freely among the cells.

SUMMARY OF THE INVENTION

The present invention address a critical problem at the edges of cellular networks. The problem is that caching cannot be deployed at these nodes because the client may change cell sites before the cache finishes serving content to the client. This defect prevents caches from being used to mitigate traffic flow from the networks' edge to its core. The consequence is that the network owners must upgrade these networks to handle the full traffic load. Putting functional caches at the edge will save carriers 100s of millions of dollars.

In the present invention, important state information related to information transmitted to and stored in Node B cell sites resides in user mobile device instead of the Node B con sites of the conventional and current technology. In the method of the present invention, information requested by a user is stored at the core location cache and is transmitted to the Node B cell site currently in communication with the requesting user. The cell site receiving the information stores it in the cell site cache location. The information is transmitted to the requesting user. Upon another request for that information the core location will first check the core cache to determine if the requested information is stored. If the information is stored, the core sends a token to the requesting device which will enable to requesting to retrieve the requested information from the cell site in communication with the requesting device. The token contains state information that will enable to requesting device to retrieve the information from the cell site. If the requested information is not in the cell site currently in communication with the requesting mobile device, the core device will send the information to the current cell site. The current cell site will save the information in its cache and transmit the information to the requesting mobile device. With this approach state information will reside in the mobile device and not in the cell site locations.

DESCRIPTION OF THE INVENTION

Figure 3:
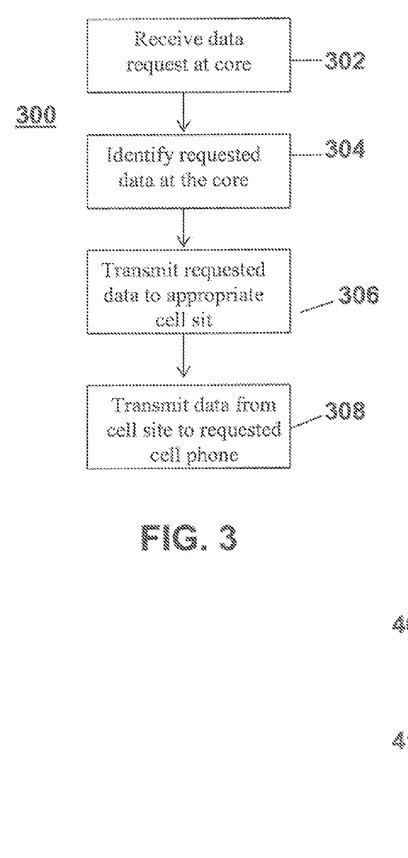
FIG. 3 is a flow diagram of the steps in a general implementation of the method of the present invention.

The system of the present invention provide a means to reduce the amount of traffic on the microwave links between the Node B cell sites and the network core. This reduction in traffic on the microwave links enables the network to better accommodate the increasing volume of data traffic transmitted across the network. FIG. 3 illustrates the basic steps 300 in the implementation of the method of the present invention. The user requests data from the network. This request is received and processed at the network core 112 in step 302 of this method. At the network core, the requested data is identified in step 304. Step 306 transmits the requested and identified data to the appropriate Node B cell site. Step 308 transmits the requested data from the Node B that received data and is in communication with the user device requesting the data.

The present invention expands edge byte caching features to mobile devices that move from cell site location to cell site location. In conventional byte caching, a cache is placed on each side of the cellular network; one at the edge Node B 102 and another deep in the network core 112. To understand bow these bytes caches optimize traffic across the network consider a simple example where an application on the cell phone 104 is requesting a document flora the server at the network core 112. An HTTP request liar the document is sent from the cell phone. 104 to the server. The server retrieves the document and returns the document to the network core 112. The document, is sent first to the byte cache in the network core where algorithms search the cache for byte strings that match the contents of the document. Matching strings are replaced in the document by tokens that reference the location of the corresponding byte string in the byte cache. Once all matching strings have been found the original document is added to the byte cache and the tokenized version is sent to the requesting client via the edge byte cache in the Node B cell site 102 that is currently connected to the requesting cell phone device. The byte cache at Node B saves the parts of the document that are not tokenized and sends the whole document to the user.

The client (Node B cell site) has the responsibility to reconstitute the original document by replacing the tokens it contains with their corresponding bytes. To do this, the client sends each token to the edge byte cache requesting the corresponding bytes it represents. The edge byte cache can provide this data because it's a duplicate of the cache from which the token was created. Using the edge byte cache in this way the client can rebuild the entire document.

Figure 4:
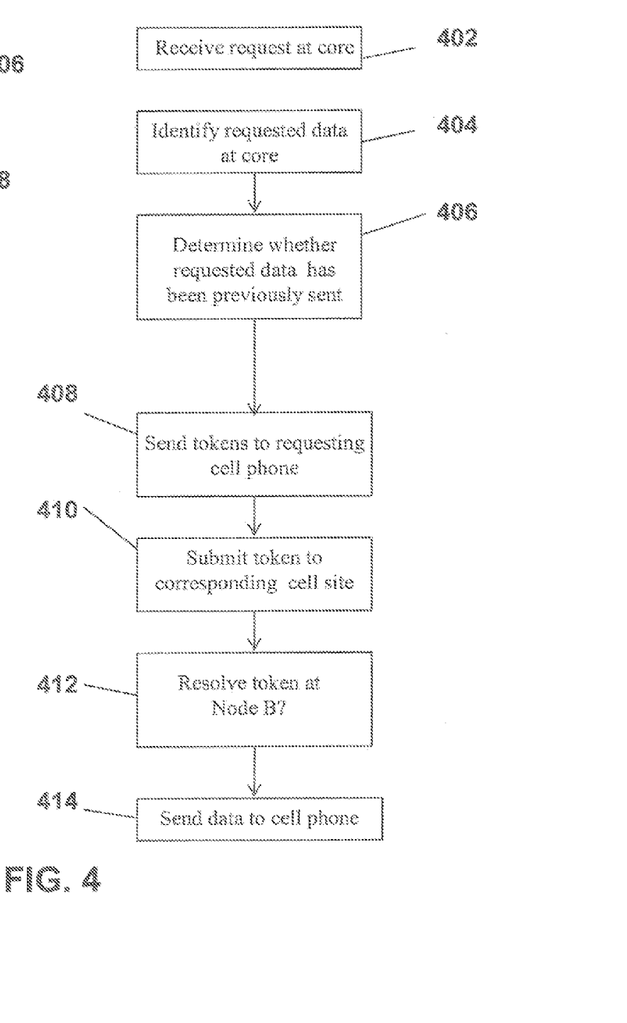
FIG. 4 is a flow diagram of the steps in the implementation of the method of the present invention using edge caching.

FIG. 4 illustrates the basic steps in the implementation in the present invention. The user device sends a request to the network core for data. This request could be to download c movie or other form of data. The network core receives the request in step 402 and processes the request in an internal software module. The network core then begins to identify the request and determine if it has the requested data in step 404. As mentioned, this step involves searching the network care byte cache for the requested data. When there is the determination that the network core cache has the requested data in step 406, a token is sent, in step 408 to the requesting device with information that will enable the Node B cell site to retrieve the information from its byte cache. The token implies that the network core has already sent the requested information to the current Node B in communication with the requesting device. Therefore the Node B can send the data to the requester without the need to send information over the microwave links. In step 410, the data requester sends the token to Node B to resolve. In step 412, the Node B receives the token and identifies the data in its cache. Step 414 then sends the data to the requesting device.

Figure 5:
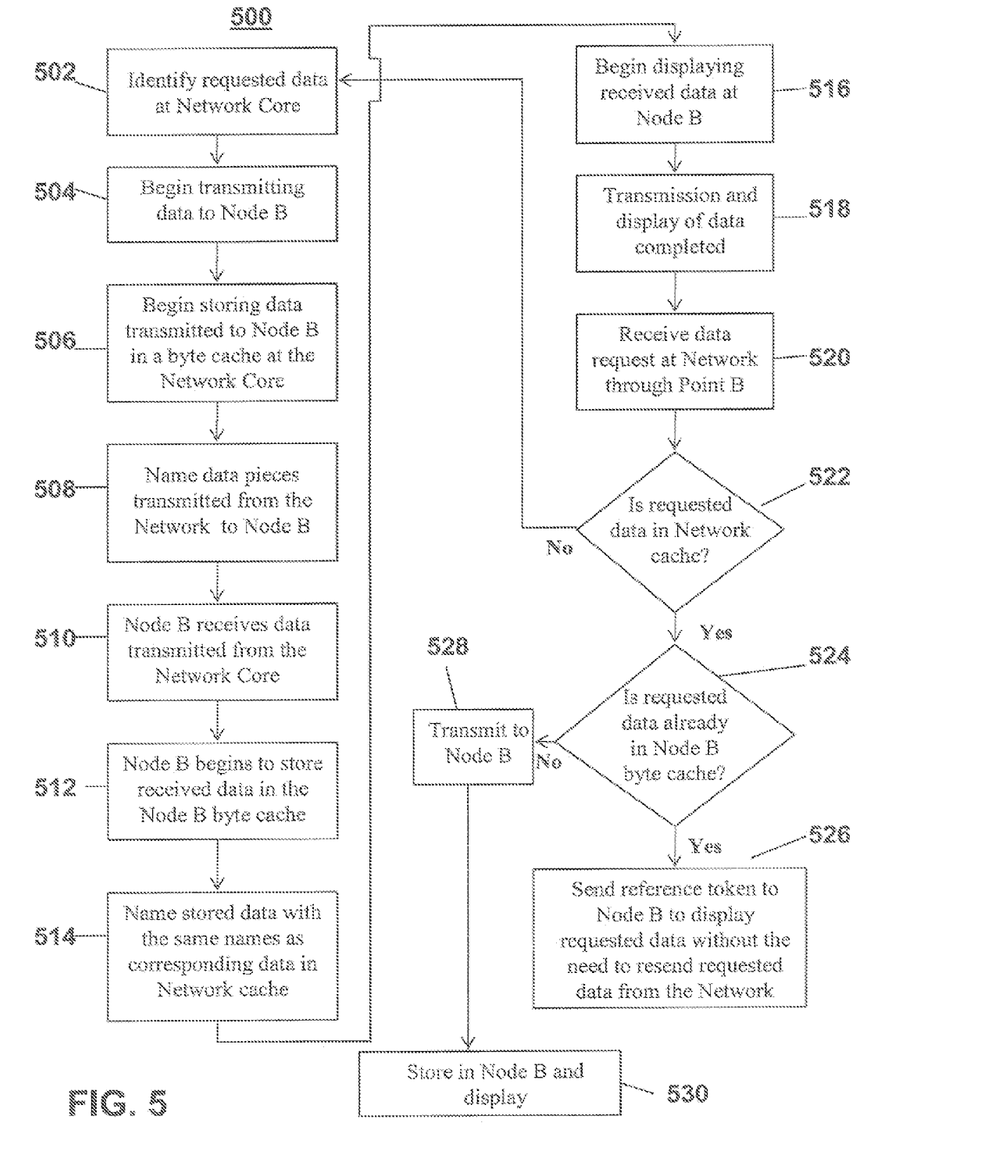
FIG. 5 is a detailed flow diagram of the steps implementation of the method of the present invention when a data request is received at the network core.

Referring to FIG. 5 illustrated is a general implementation of the method of the present invention 500 using edge caching when there is a request for data that has never been requested from the network core. As mentioned in FIG. 1, a cell phone device can receive information by sending a data request through a Node B location to all the way to the Network Core. When Node B receives a data request, step 502 identifies the requested data. This identification process can involve a search of the local Network Core cache or a retrieval of the information from other data sources. Once identifies the requested information, step 504 begins to transmit that information to Node B. As the Network Core transmits this information to Node B, step 506 begins to name the data bytes being transmitted from the Network Core to Node B. Step 508 stores the data bytes being transmitted in a byte cache memory in the Network Core. In step 510, Node B receives the data bytes transmitted from the Network Core. Step 512 begins to store the received data in the byte cache at Node B. The data bytes are named with the same names as the corresponding data bytes in the Network Core cache. This data byte naming in the Node B cache occurs in step 514. Once data bytes are stored in the Node B cache, step 516 transmits these bytes to the requesting device.

Still referring to FIG. 5, at a later time, the Network Core receives another request for the information in step 520. This request could be from the same device that previously requested the information or from a new device. However, for this illustration, the request comes through the same Node B. Once the Network Core receives the request, step 522 makes a determination of the whether the requested data is in the Network Core byte cache. If the information is in the Network. Core byte cache, this means that there has been a previous request for the information and that the information has been previously sent to a Node B. In this case, step 524 would send a reference token to the requesting device. This token contains the state information about the data that will enable the requesting device to retrieve the information from the local Node B. This reference token also requires much less bandwidth than would be required to resend the entire set of requested data over the microwave links from the Network Core to the requesting device. Also, by sending state information in the reference token to requesting device, the state information does not reside in the Node B cell site locations. A user will not lose state information when the user moves from one cell site to a different cell site.

In step 526, the requesting device receives the token and submits the token to the local Node B. Node B takes the token determines whether it has the information described in the token in the Node B byte cache. If the determination in step 526 is that Node B does have the information in its byte cache, step 528 send the information to the requesting device. If Node B determines that it does not have the information described by the received token, Node B inform the requesting device that the token cannot be resolved at Node B, if Node B cannot resolve the token, this particular Node B was not the Node B location that originally received and stored the information. Since in this description, Node B represents a Node B cell site, this particular Node B cell site was not the Node B cell site through which the original data request came. If the second request is from the same requester as the first request, for the second request, the requesting device is connected to a different Node B cell site that it was when the original data request was made. At this point, the Network Core is informed that Node B does not have the information. Step 530 will resend the requested information to the Node B location through which this second request is made. This Node B site would save the information in its byte cache and send it to the requesting device. In the implementation of the method of the present invention, the requesting devices (the end user cell phones) communicate with the network core through the Node B cell sites.

Figure 6A:
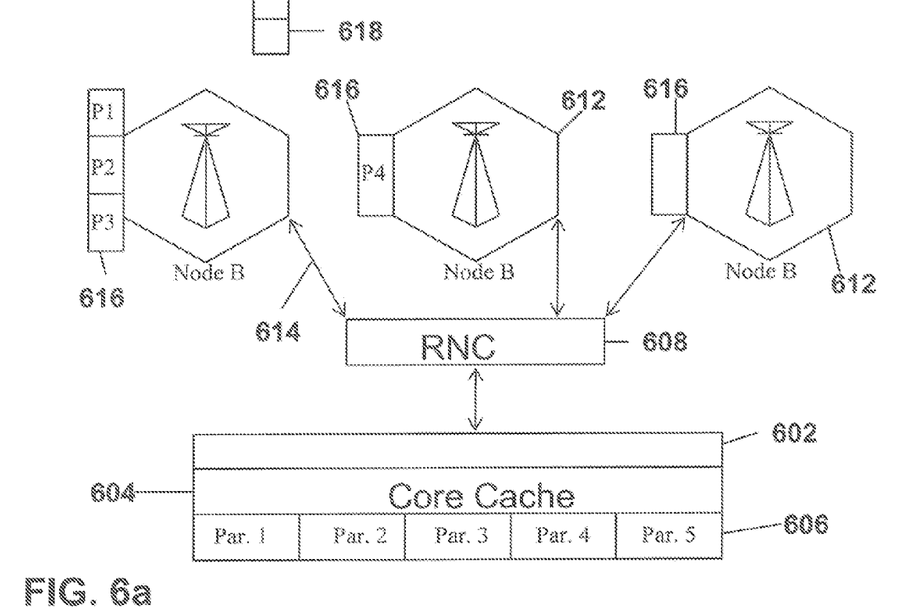
FIGS. 6a and 6b are illustrations of the transmission of data in a series of individual packets transmitted from the network core and stored in cache memory locations in the network core and in the Node B cell sites.
Figure 6B:
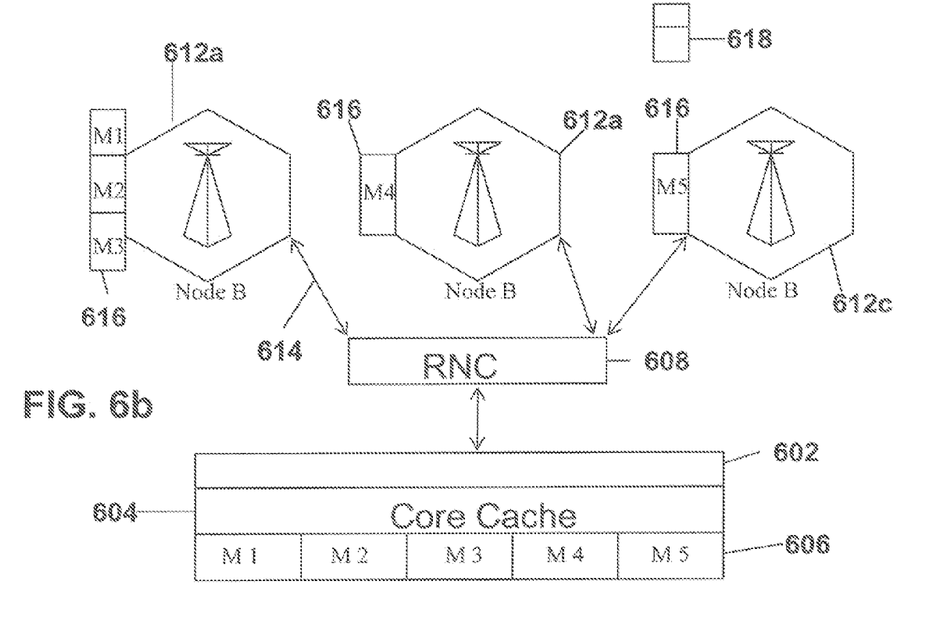

FIGS. 6a and 6b illustrate the configuration of the system of the present invention during the transmission of information from the Network Core 602 ultimately to the requesting cellular telephone device 618. As shown, in this system, the Network Core 602 has a cache memory 604 that stores information that the Network Core transmits through the RNC 608 to Node B cell sites 612a, 612b and 612c. Information can be stored in the Network Cache in bytes 606. The information from the Network Core travels to the RNC through link 610. Information then travels to the Node B cell sites through link 614. As previously described, the Node B cell sites 612 also store received information in byte caches 616. In this illustration, the first Node B 612a has three bytes of data in its byte cache. The second Node B 612b has one byte of information in its byte cache. The third Node B 612c currently does not have any information in its byte cache.

Figure 7:
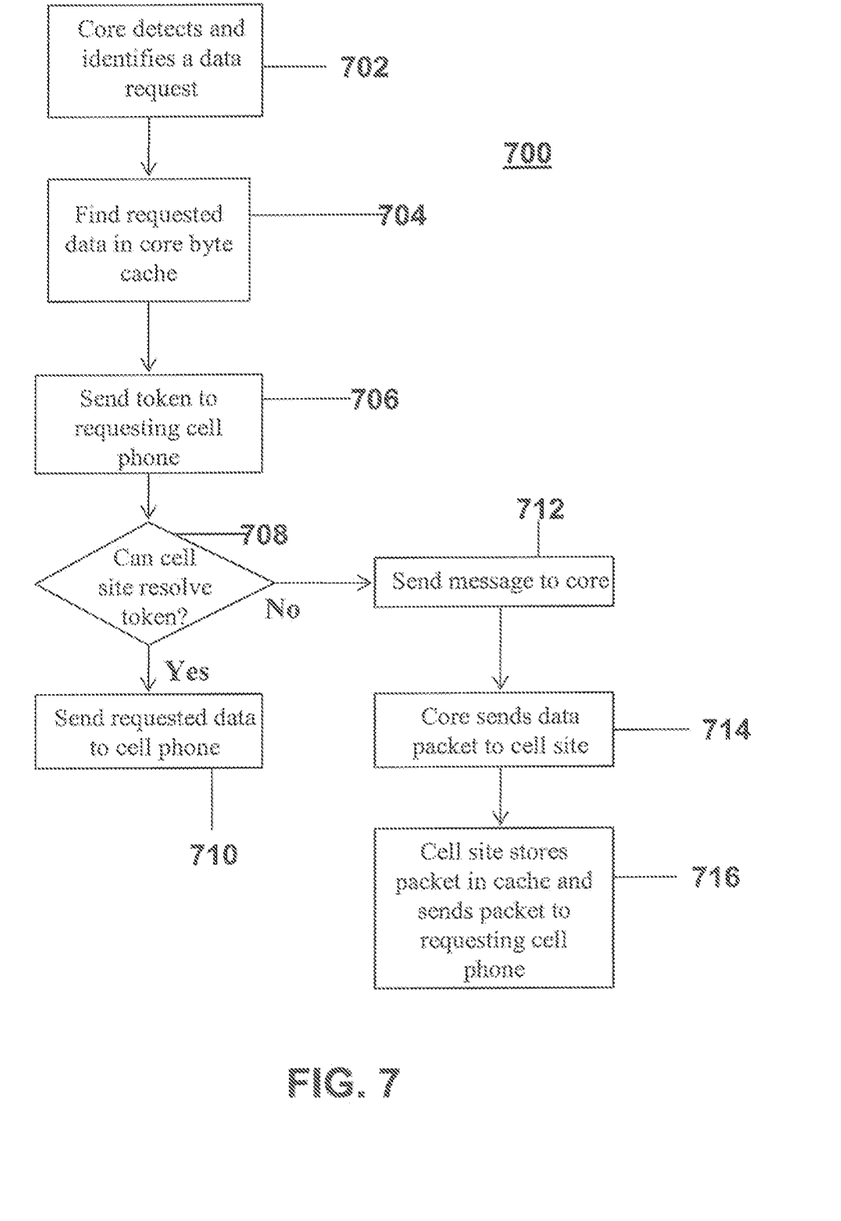
FIG. 7 is a flow diagram of the steps in the implementation of the present invention when a Node B cell can resolve a token.

In FIG. 6a, the cellular telephone device is m communication with the first Node B 612a which has the three bytes of information in its byte cache. In FIG. 6B, the user of the cellular telephone device has moved and now is in communication with the third Node B 612c which does not have any information stored in its byte cache. The method described in FIG. 7 provides the steps to the implementation of the system illustrated in FIG. 6a. For example, a user wants to modify a document which has five paragraphs. At the Network Core 602, the initial step 702 detects the request for data and identifies the data in that request. The data request could be to retrieve and modify the first paragraph (P1) of the document. The data request goes out from the cellular telephone device 618 to the Network Core 602. Once the request is detected, step 604 determines whether that data is stored in the Network Core cache. As shown in FIG. 6a, all five paragraphs are stored in the Network Core cache 606. FIG. 6a also shows, that some of the Node B cell sites have portions of the requested document data. Because, some of the requested data is contained in the Node B cell sites, the Network Core has previously transmitted this information to Node B cell sites. Since the determination in step 704 is that the Network Core contains the requested data and that the data has been previously sent, the Network Core does not want to resend previously sent information. Instead the Network Core sends a token, in step 706, to the requesting cellular telephone with the state information needed to retrieve the requested data from the Node B cell site. At this point, the cellular telephone device 618 presents the token to the Node B cell site through which the cellular telephone is communicating. In step 708, there is a determination of whether the Node B receiving the token can resolve the token and send the requested data to the cell phone. Since the first Node B cell site 612a does have byte P1, this byte is sent directly to the requesting user device in step 710. This same process repeats for byte P2 and byte P3.

As shown in FIG. 6a, the document is broken into five bytes (P1, P2, P3 P4 and P5) that are stored in the Network Core cache 602. The document has been previously transmitted from the Network Core to the Node B cell sites. However, as shown in the in Node Bs, not one Node B has all five bytes stored. The first Node B 612a has three bytes of the document and the second Node B 612b has one byte of the document. The third Node B 613c shown does not any bytes of the document stored in its byte cache. The reason for the storing of the document bytes in different Node B caches is that during a previous transmission of the document from the Network Core to the Node B, the requesting cellular telephone device moved from one cell site to another cell site. This movement from one Node B to a different Node B caused the transmission of the document to switch from one Node B to a different Node B. Referring back to FIG. 6a, during the initial request for the document, the Network Core stored the entire document in its byte cache. However, if there have been several requests for the document, a transmission may have gone to several Node Bs because of the movement of the requesting cellular device. The current received by the cellular device would be stored in the cell site currently in communication with the requesting cellular device. The result of that movement could be the configuration in FIG. 6a where one cell site 612a has three bytes; another cell site 612b one byte and a third cell site 612c does not have any bytes the document.

As mentioned, in step 706 the Network Core sends a token to the requesting cellular device instead of resending the document. For example, the cellular device 618 is in communication with the third cell site 612c and wants to resolve a token for P5. In step 708, the third cell site does not have P5 stored and therefore cannot resolve, that token. In this case, step 712 would send a message to the Network Core toiling it that the cell site does not have P5. This message comes from the cellular device 618 through the cell site 612c. At this point, in step 714, the Network Core would send the data in P5 to cell site 612c. This cell site would store the received P5 data in its byte cache and send it to the requesting cellular device 618. In practice, for a document that has been edited, only changes to the information contained in the byte (P1-P5) need to be sent and stored in the be caches and not the entire byte file.

To summarize, the deeper and harder problem of byte caching in the present invention arises when a client is rebuilding a document while navigating between two cells. For discussion, cell 612a is the cell in which the request for the document is made and where the first token is converted. While requesting token 2 the P2, the client is transitioned from cell 612a into cell 612b. Now the request for token 2 goes to the byte cache in cell 612b. Here the possibility exists that this byte cache does not contain the bytes corresponding to token 2. If it has the bytes for P2, then they are returned to the client. In this case, cell 612b does not have P2, therefore, the 612b cache requests the respective bytes from the cache in the core network. In this way the bytes flow to each cache separately but only one per cache, which is expected. Thus the core network does not have a separate cache for each cell site cache (Node B) in the network. This conserves cache storage and simplifies the caching algorithm. Note that in this invention the edge caches sniff the packets, originating from mobile devices, looking for a unique IP address that identifies the edge cache. The same IF address is used to reference every edge cache. So it's not a real address but a marker that a packet is intended for the cache. In this way, mobile devices can access the cache in any cell.

FIG. 6b shows the distribution of bytes for a document was saved in multiple Node B eon sites 612. As mentioned, this can occur when a cellular device moves between cell sites during the transmission of data to the cellular device. For example, a user wants to view it movie from his/her cellular device 618. The user initially sends a request for the information (movie) to the Network Core 602. The Network Core sends the movie to Node B 612a. Later there is another request the same movie. The Network Core receives this request and determines that the particular movie has already been seat to a cell site. Therefore the Network Core sends tokens to the cellular device so that the device can get the movie hunt the cell site (Node B 612a). While watching the movie, the user moves from the cell site receiving the movie 612a to cell site 612b. At the time of the move the movie is on byte M3. Referring to the method 800 illustrated in FIG. 8. Movement of the cellular device from Node B cell site 612a is detected in step 802. Signal strength could be one indicator of movement of the cellular device from one cell site to another cell site. At this point, step 804 will determine if the new cell site 612b has the next be M4 in its byte cache. A token for the M4 movie byte is sent to cell site 612b to determine if the cell site can resolve or convert the token into that portion of the movie. As shown in FIG. 6b, cell site 612b does have the next byte M4 of the movie. In this case, at the completion of the M3 byte, cell site 612b which is currently in communication with the cellular device, will transmit the M4 movie byte to the cellular device in step 806.

Figure 8:
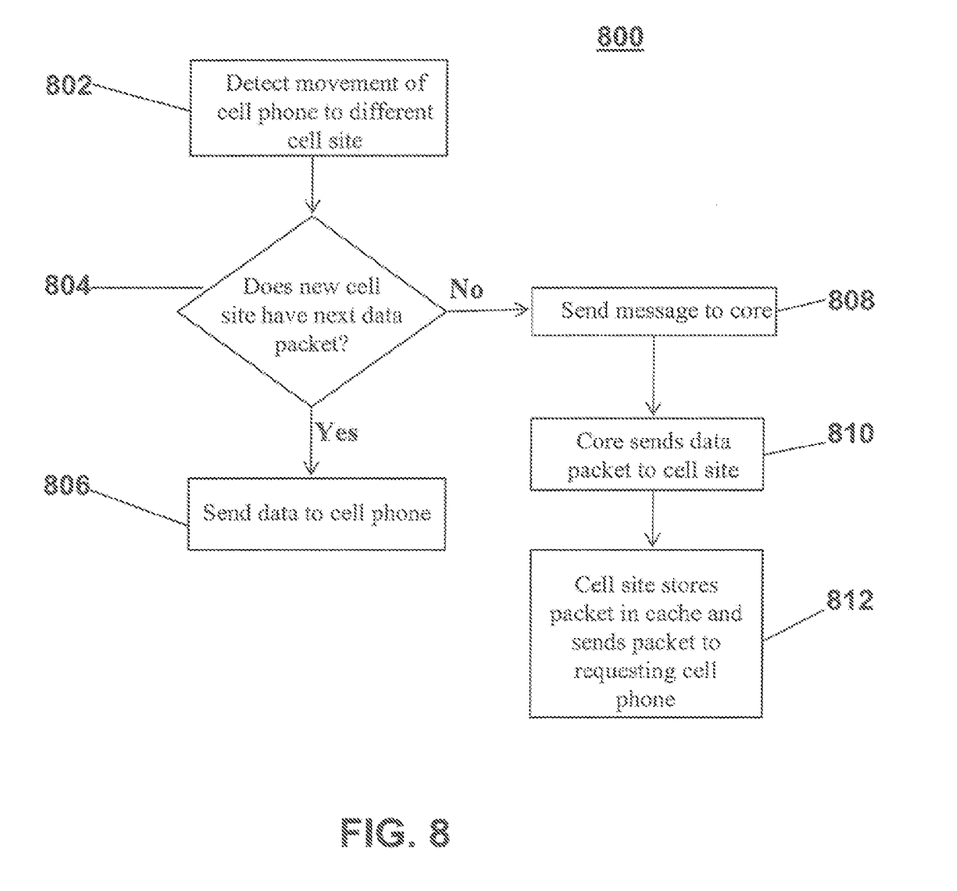
FIG. 8 is a flow diagram of the steps in the implementation of the present invention when a user moves from one cell site location to another coil site location during the transmission of data requested by the user.

However, in the present configuration, if the cellular device 618 had moved from cell site 612a to cell site 612c, then in step 804, the new cell site 612c would not have the M4 movie byte stored in its cache. In this case, step 808 would send a message to the Network Core that the current cell site does not the data in byte M4 in its cache. At this point, in step 810, the Network Core would send the M4 byte data to the cell site 612c. In step 812, this cell site would store the received information in its byte cache and send the movie data to the requesting cellular device for showing.

Further, in this invention, it's understood that the client can simultaneously send multiple (or all) tokens to the edge cache for resolution concurrently to minimize protocol chattiness. When this is the case the client monitors the completion of each token and makes duplicate requests as required. This approach allows for the circumstances where a cell site change occurs while the edge cache is resolving the tokens given to it. The client can navigate cell site changes because the client keeps all state information. The edge caches are completely stateless.

In this disclosure HTTP is used for convenience only. The concepts presented herein are protocol agnostic. Moreover, a distinct advantage of this invention is that the data being fetched from the server (on the right in FIG. 1) passes through the billing, rating, lawful intercept and the adult content filter elements in the network before it reaches the core network byte cache. The caches therefore need not concern themselves with providing these services. This is an enormous benefit and is an advantage over object caching at the edge network, which must provide these services.

It is important to note that while the present invention has been described in the context of a fully functioning cellular network system, those skilled in the art will appreciate that the components and processes of the present invention are capable of being distributed in the form of instructions in a computer readable storage medium and a variety of other forms, regardless of the particular type of medium used to carry out the distribution. The method of this invention provides significant advantages over the current art. The invention has been described in connection with its preferred embodiments. However it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of this invention.

We claim:

1. A system of edge-byte caching for reducing traffic in a cellular network comprising:
    a plurality of electronic mobile cellular devices capable of receiving and transmitting voice and data information;
    one or more network edge devices each having antenna and communication logic and being capable of establishing communication links with said electronic mobile cellular devices and each network edge device having a cache memory for storing data for transmission to said electronic mobile cellular devices;
    a network core having at least one server device for gathering, storing and transmitting requested data to said electronic mobile cellular devices, said network core also having a cache memory for storing transmitted data;
    token packets transmitted between said network core, said network edge devices and said electronic mobile devices;
    state information contained in token packets transmitted from said network core to an electronic mobile cellular device of a plurality of said electronic mobile cellular devices for enabling the said electronic mobile cellular device to receive data from said network core, said state information includes information identifying data that has been previously transmitted from said network core to network edge devices, such that the previously transmitted data can be retrieved by a requesting electronic mobile device without the need to retransmit the requested data from the network core.

2. The system as described in claim 1 wherein said cache memory in said network core is a byte-cache memory and said cache memory in said each network edge device is a byte cache memory.

3. The system as described in claim 1 further comprising a radio node controller (RNC) which establishes communications between said network core and said network edge devices.

4. The system as described in claim 1 said network core further comprises a software module for processing data requests and for performing data searches of data stored in a byte cache of said network core.

* * * * *